July 21, 1925.

T. TROMANS ET AL 1,546,815

STOP DEVICE FOR USE WITH CHANGE SPEED PEDALS OF AUTOMOBILES

Filed Jan. 19, 1925

INVENTORS
THOMAS TROMANS
WALTER T. SMITH
BY G. H. Braddock
ATTORNEY

Patented July 21, 1925.

1,546,815

UNITED STATES PATENT OFFICE.

THOMAS TROMANS AND WALTER T. SMITH, OF BRIDGEPORT, CONNECTICUT.

STOP DEVICE FOR USE WITH CHANGE-SPEED PEDALS OF AUTOMOBILES.

Application filed January 19, 1925. Serial No. 3,479.

*To all whom it may concern:*

Be it known that we, THOMAS TROMANS and WALTER T. SMITH, citizens of the United States, and residents of Bridgeport, in the county of Fairfield and State of Connecticut, have invented certain new and useful Improvements in Stop Devices for Use With Change-Speed Pedals of Automobiles, of which the following is a specification.

This invention relates to a stop device for use with change speed pedals of automobiles.

An object of the invention is to provide a stop device of the present character which will be an improvement generally over more or less similar devices heretofore known.

A further object is to provide a stop device for use with change speed pedals which can be secured to a part of an automobile independently of the floor board, whereby a floor board can be removed when this is desirable without necessity for removing the stop device, and whereby the stop device will permanently remain in fixed relation to a clutch pedal of an automobile.

A further object is to provide a device as above mentioned having a curved upwardly extending arm and a stop member with curved arm in engagement with and adjustable along said curved upwardly extending arm, whereby adjustment of the stop member along the curved upwardly extending arm moves said stop member both vertically and sidewise, at higher or lower elevation with respect to a change speed pedal, and closer to or farther away therefrom, as may be desirable.

With the above and other objects in view, the invention comprises the construction, arrangement and combination of parts as now to be fully described and as hereinafter to be specifically claimed, it being understood that the disclosure herein is merely illustrative, slight changes in details of construction and arrangement of parts being permissible so long as within the scope of the appended claims.

In the accompanying drawing forming a part of this specification—

Figure 1:
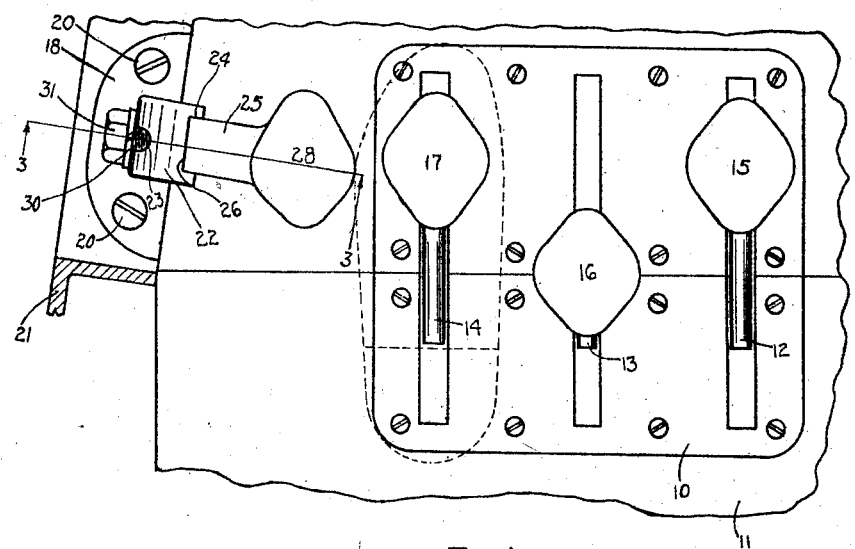
Fig. 1 is a top plan view showing the improved stop device associated with the customary pedals located above the floor board of a Ford automobile, the device being secured upon a part of the frame of the automobile adjacent the floor board.

Devices of the present type are utilized as foot rests adjacent change speed pedals of Ford automobiles. When a Ford change speed pedal is wholly depressed, the driving mechanism is geared in "low"; when said pedal is wholly elevated, the driving mechanism is in "high"; and when the pedal is approximately midway between its low and high positions, the driving mechanism is in "neutral". The foot rest serves as a "finder" for the neutral position of the change speed pedal; that is, when the brake pedal is depressed to apply the brakes, the change speed pedal is depressed from high speed position to neutral position and held in said neutral position by the foot of an operator allowed to rest upon the stop device adjacent said change speed pedal and at the elevation of said neutral position, without danger of accidentally depressing the change speed pedal into low speed position at the time of setting the brakes.

With respect to the drawing and the numerals of reference indicated thereon, 10 denotes the customary plate secured to the floor board 11 of an automobile. The plate and floor board are provided with three slots through which extend the levers 12, 13 and 14, the lever 12 having the brake pedal 15, the lever 13 having the reverse pedal 16, and the lever 14 having the change speed pedal 17.

Figures 2, 3:
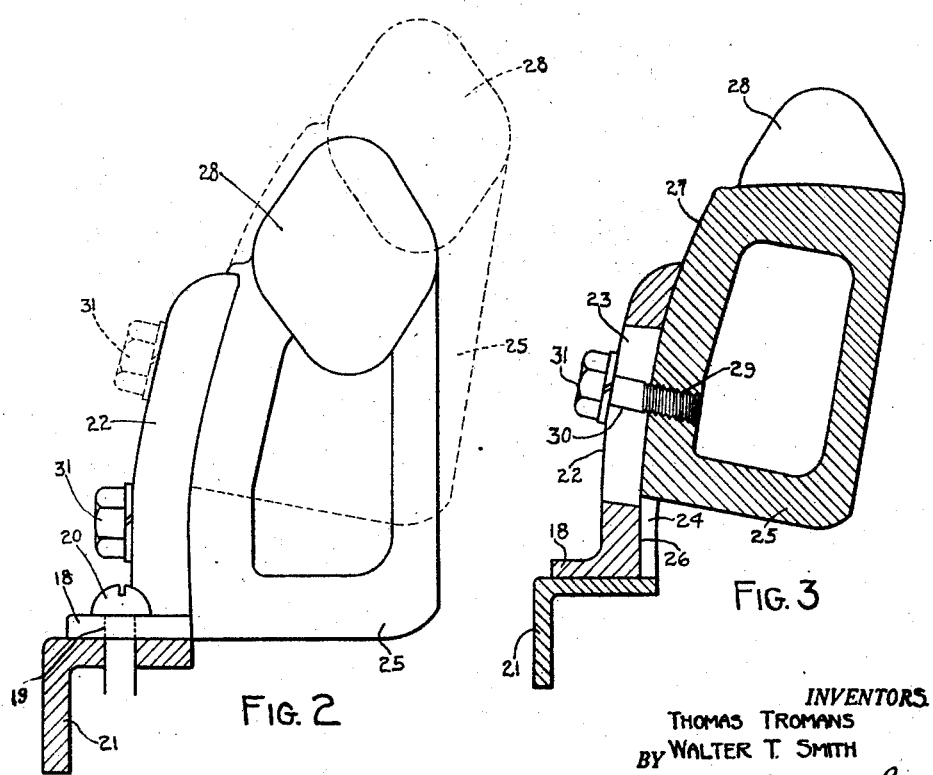
Fig. 2 is an enlarged side elevational view of the stop device.
Fig. 3 is a sectional view, on the scale of Fig. 2, taken on line 3—3 in Fig. 1, looking in the direction of the arrows.

The stop device of the invention consists of a bracket or supporting member having a horizontal portion 18 with openings 19 for securing the bracket or member, as by means of screw bolts 20, to the frame 21 of an automobile adjacent the floor board 11, and also having a curved upwardly extending arm 22 adapted to be positioned adjacent the pedal 17, the arm curving toward said pedal preferably about in the manner shown. The curved upwardly extending arm 22 is provided with a longitudinal slot 23 desirably midway between the side edges of said arm, and the face of said bracket or supporting member adjacent the pedal 17 has a way or channel 24 adapted to receive an arm 25 of the stop member, the base, denoted 26, of the way or channel having the same curve as said upwardly extending arm 22. That is to say, the way or channel 24 of the bracket or supporting member is opposite the slot 23 in the arm 22 and is continuous for the full length of said bracket or member, being included in its arm 22 and its horizontal portion 18. See Fig. 3.

The arm 25 of the stop member is adapted to slidably fit in the way or channel 24 of the bracket or supporting member and has a face 27 of the same curvature as the arm 22 and the base of the way or channel 24 adapted to slide over said base. Upon the upper end of the arm 25 is the stop member having a foot engaging portion 28.

The arm 25 of the stop device is provided with a threaded opening 29 adapted to receive a screw bolt 30 extending through the longitudinal slot 23 of the arm 22 and having a head 31 adapted to engage the face of said arm 22 opposite the stop member. Clearly, the screw bolt can be loosened and the stop member with arm can be adjusted. By tightening the screw bolt down after adjustment, the stop member with arm can be fixed with respect to the bracket or supporting member. Referring to the dotted lines of Fig. 2, it will be apparent that adjustment of the arm 25 upwardly along the arm 22 moves the stop member both upwardly and toward the pedal 17. Adjustment of the arm 25 downwardly along the arm 22, naturally, moves the stop member downwardly and away from said pedal 17. Consequently, a single upward or downward adjustment also provides for lateral adjustment of the stop member. In order to bring the pedal 17 into low speed position the foot is given a slight sliding movement to clear the stop member.

The operation and advantages of the invention will be obvious. When the driver of an automobile depresses the brake pedal, and also attempts to depress the change speed pedal from high speed position into neutral, there is a tendency for him to continue depressing the latter pedal into low speed position. The result is that although the brakes are set, the engine continues to drive the automobile with increased power through the low speed gears, with consequences which are apt to be disastrous. Liability of accidents in this particular is obviated by the improved stop device. The advantage of supporting the stop device upon a fixed part rather than upon the floor board is that the stop device is thus secured in positively fixed relation to the clutch pedal. The advantage of simply sliding the stop member along the bracket to accomplish both vertical and lateral adjustment of the stop member is obvious.

Having thus fully described the invention, what we claim as new and desire to secure by Letters Patent is:

1. A stop device for use with change speed pedals of automobiles, consisting of a support, means for securing said support to a frame adjacent the floor board of an automobile, and a stop member mounted to be vertically and laterally adjustable upon said support and adapted to be positioned to be engaged by the foot of the driver of said automobile when the change speed pedal is moved to neutral position.

2. A stop device for use with change speed pedals of automobiles, consisting of a support including a curved upwardly extending portion adapted to be located adjacent a change speed pedal, means for securing said support to an automobile, a stop member having a horizontal foot engaging portion and a vertical portion, said curved upwardly extending portion being provided with a slot and with a way opposite said slot, the way having a base of curved conformation, and said vertical portion being adapted to fit said way and having a curved face adapted to slidingly engage the base of said way, a screw bolt extending through said slot and entering said vertical portion of said stop member, and a head upon said bolt and adapted to engage said curved upwardly extending portion, whereby the stop member can be adjusted vertically and laterally with respect to said change speed pedal and can be locked in any position to which adjusted.

3. A stop device for use with change speed pedals of automobiles, consisting of a support, means for securing said support to a part of an automobile adjacent the change speed pedal thereof, and a stop member mounted to be vertically and laterally adjustable upon said support and adapted to be positioned to be engaged by the foot of the driver of said automobile when the change speed pedal is moved to neutral position.

4. A stop device for use with change speed pedals of automobiles, consisting of a support and a stop member mounted on said support, the stop member being adjustable vertically and laterally upon said support and the support being rigidly secured upon the frame of an automobile adjacent the floor board thereof, whereby the cooperative relation of the stop member to a clutch pedal is positively fixed.

Signed at Bridgeport, in the county of Fairfield, and State of Connecticut, this 17th day of Jan. A. D., 1925.

THOMAS TROMANS.
WALTER T. SMITH.